United States Patent [19]

Havenga et al.

[11] Patent Number: 4,996,855
[45] Date of Patent: Mar. 5, 1991

[54] LOCK MECHANISM

[76] Inventors: Robert B. Havenga, 7208 Orchard Pl., Downers Grove, Ill. 60516; Albert J. Havenga, Jr., 906 E. School St., Lombard, Ill. 60148

[21] Appl. No.: 386,616
[22] Filed: Jul. 31, 1989
[51] Int. Cl.[5] ............................................... E05B 73/00
[52] U.S. Cl. ............................................. 70/14; 70/58
[58] Field of Search ................ 70/14, 57, 58; 280/507; 108/55.1; 414/403, 498; 294/1.1, 28.1; 220/1 T, 1.5, 85 R, DIG. 20

[56] References Cited

U.S. PATENT DOCUMENTS

| | | | |
|---|---|---|---|
| 2,571,349 | 10/1951 | Eckles . | |
| 2,883,850 | 4/1959 | Falek | 70/232 |
| 3,782,761 | 1/1974 | Cardin, Sr. . | |
| 4,376,544 | 3/1983 | Sette | 280/507 |
| 4,380,160 | 4/1983 | Hoffman . | |
| 4,409,804 | 10/1983 | Sork . | |
| 4,459,832 | 7/1984 | Avree | 70/14 |
| 4,480,450 | 11/1984 | Brown . | |
| 4,538,827 | 9/1985 | Plifka . | |
| 4,620,718 | 11/1986 | Mickelson | 280/507 |
| 4,693,096 | 9/1987 | Mercer | 70/14 |
| 4,774,823 | 10/1988 | Callison | 70/14 |

Primary Examiner—Robert L. Wolfe
Attorney, Agent, or Firm—Marshall, O'Toole, Gerstein, Murray & Bicknell

[57] ABSTRACT

A security lock mechanism for use with a hook-up of a roll-off skid. The hook-up includes at least one plate having an opening formed in it for engagement by a coupler of a hoist truck. The lock mechanism comprises a first part shaped to be positioned closely adjacent the plate, and a second part shaped to extend through the opening of the plate and to be connected to the first part. A lock interconnects the first and second parts for securing them together and to the hook-up.

12 Claims, 4 Drawing Sheets

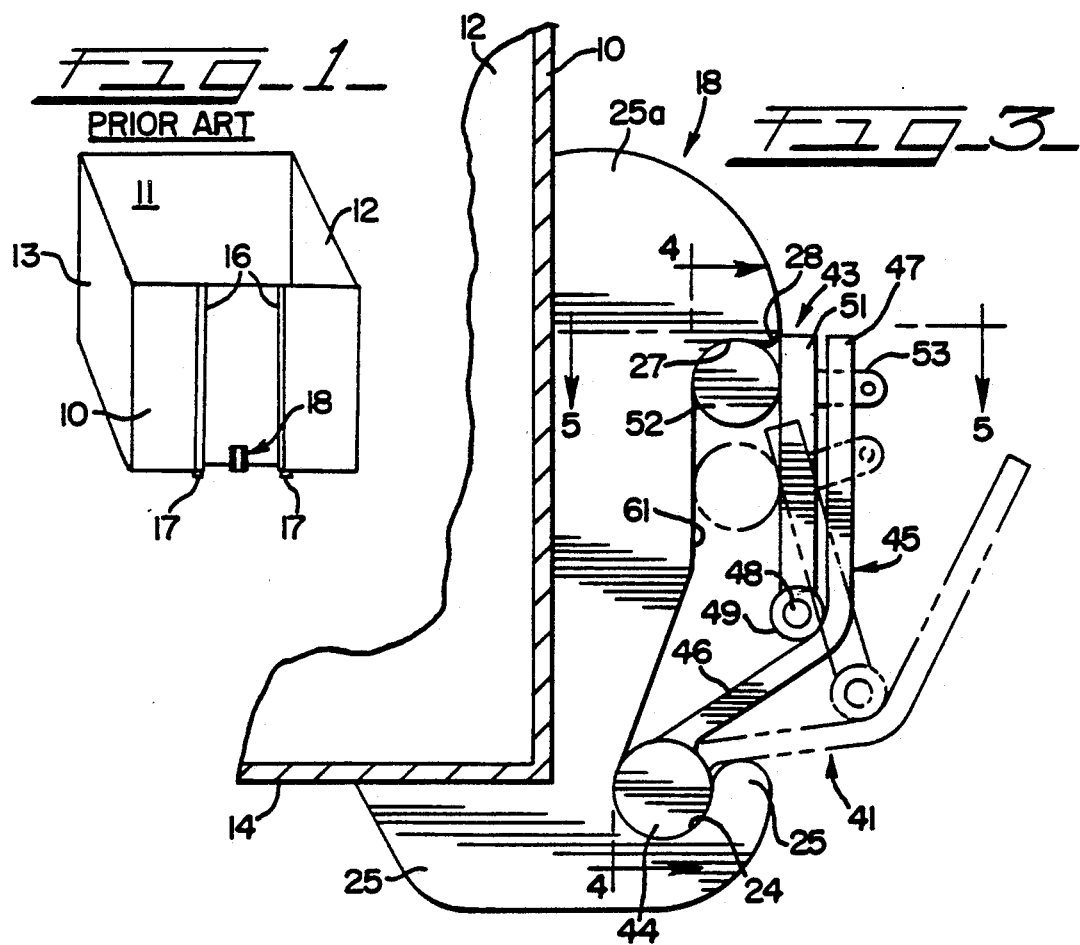
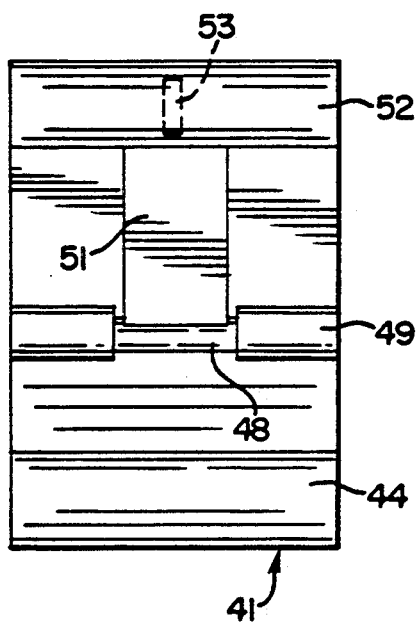
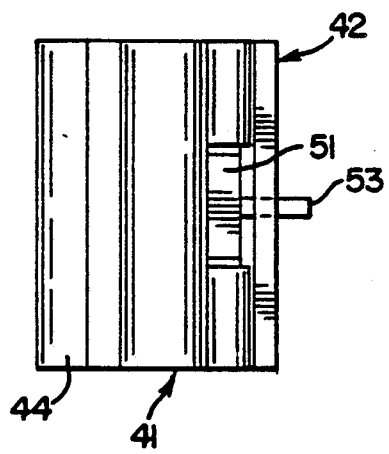

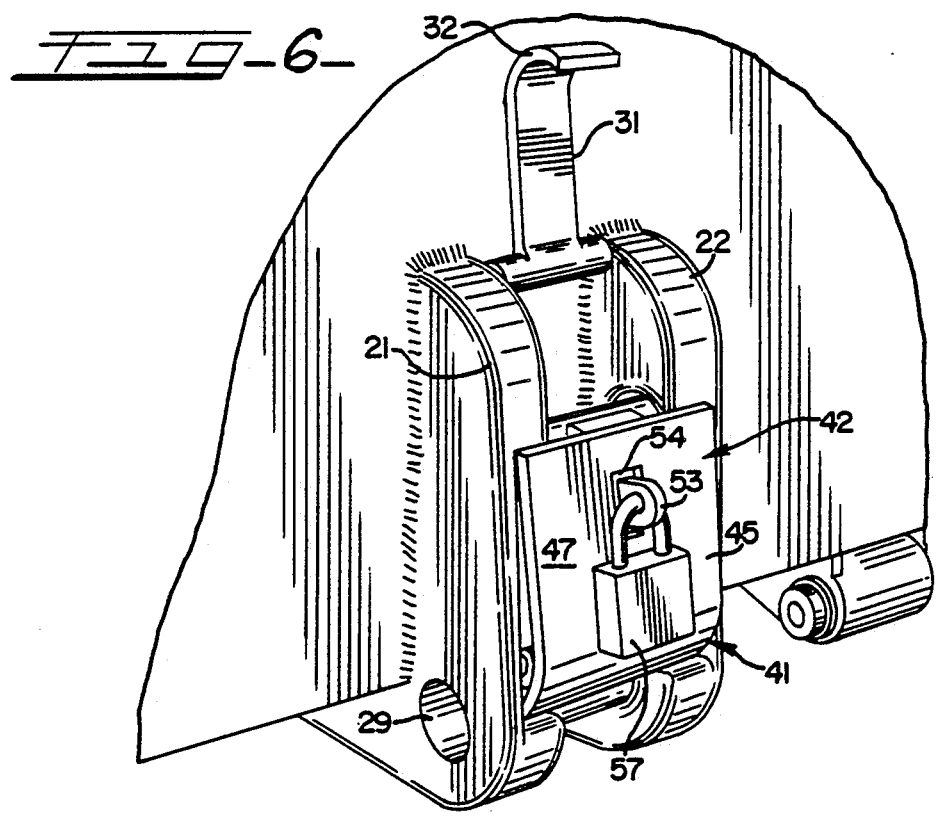
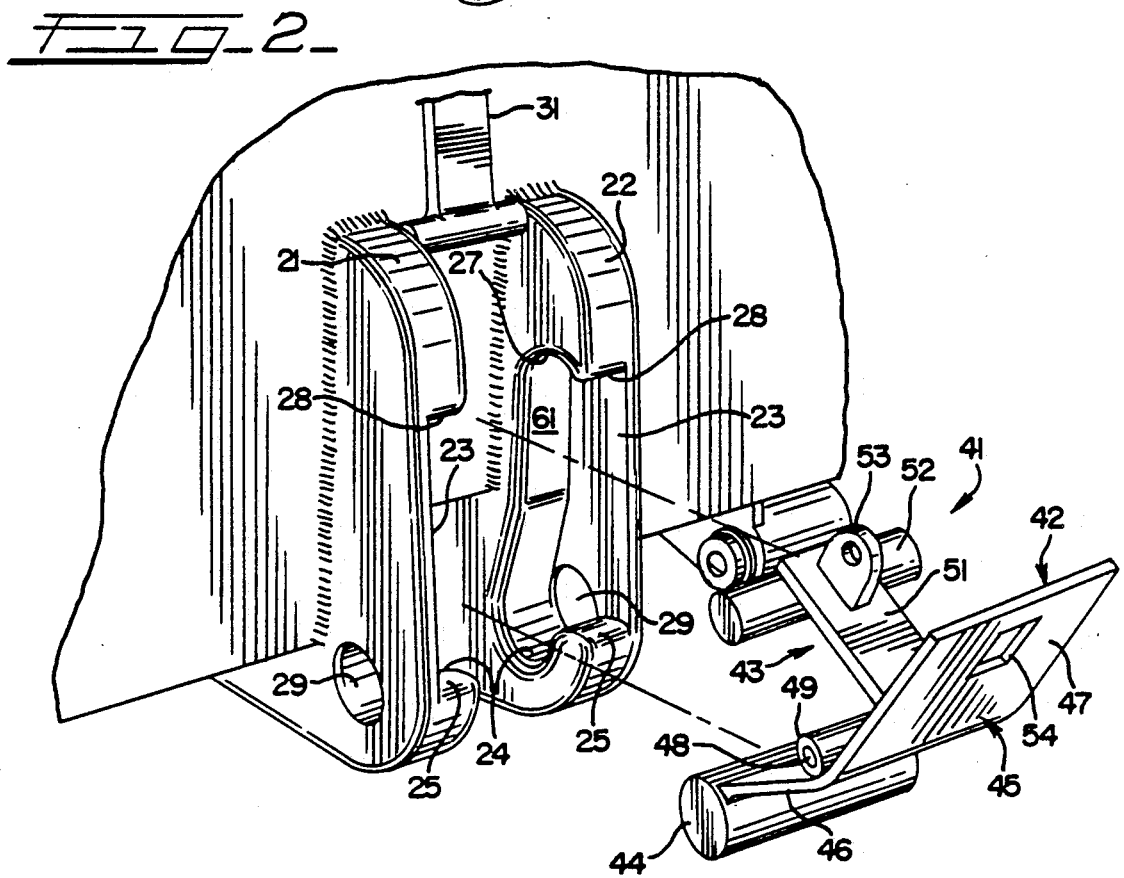

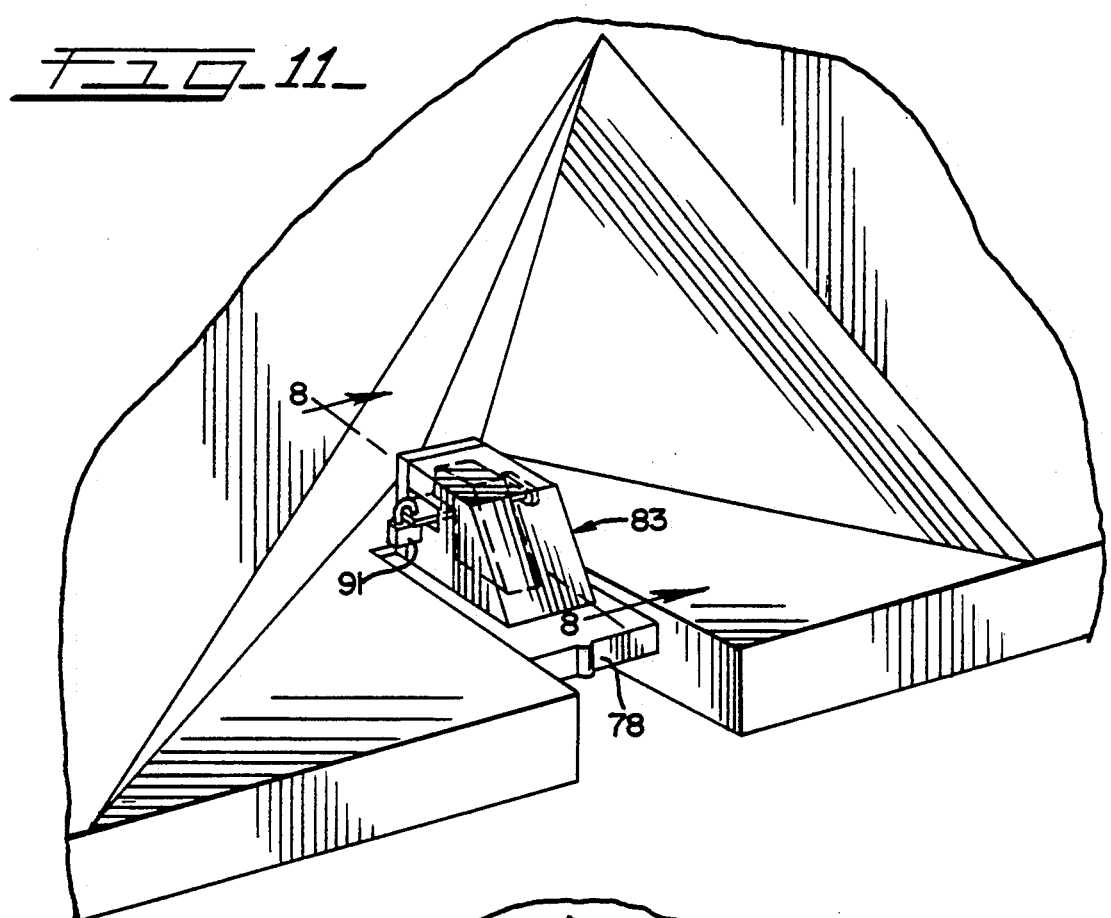
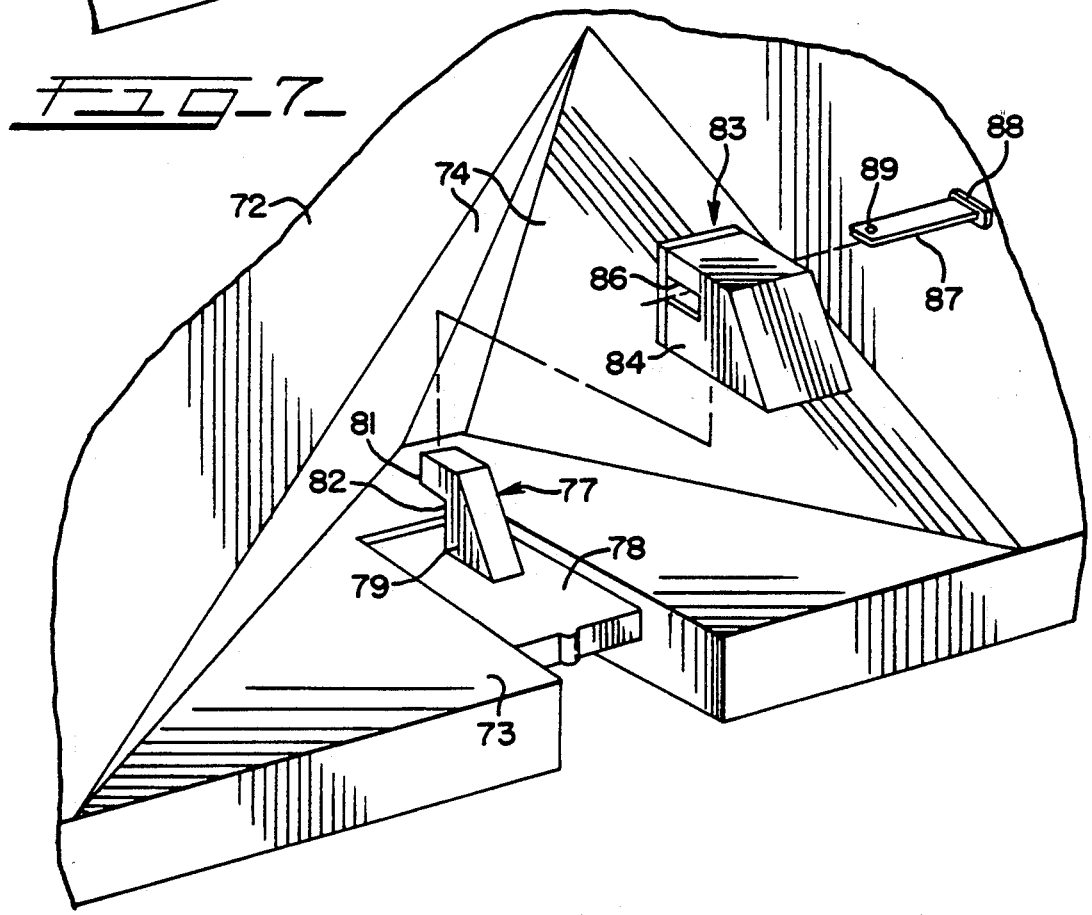

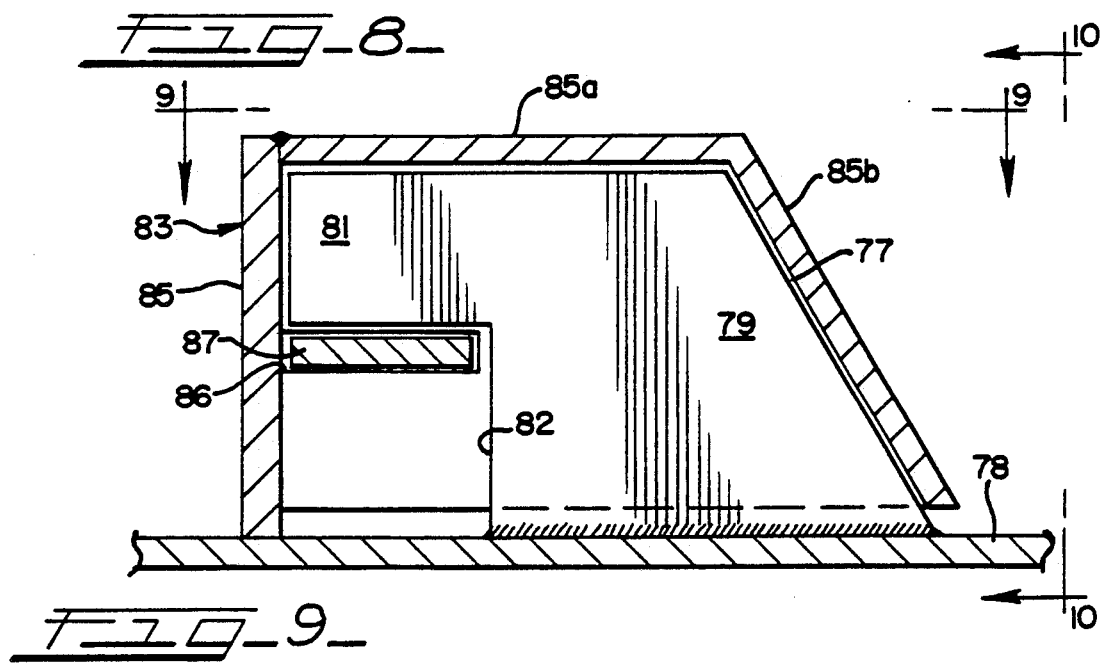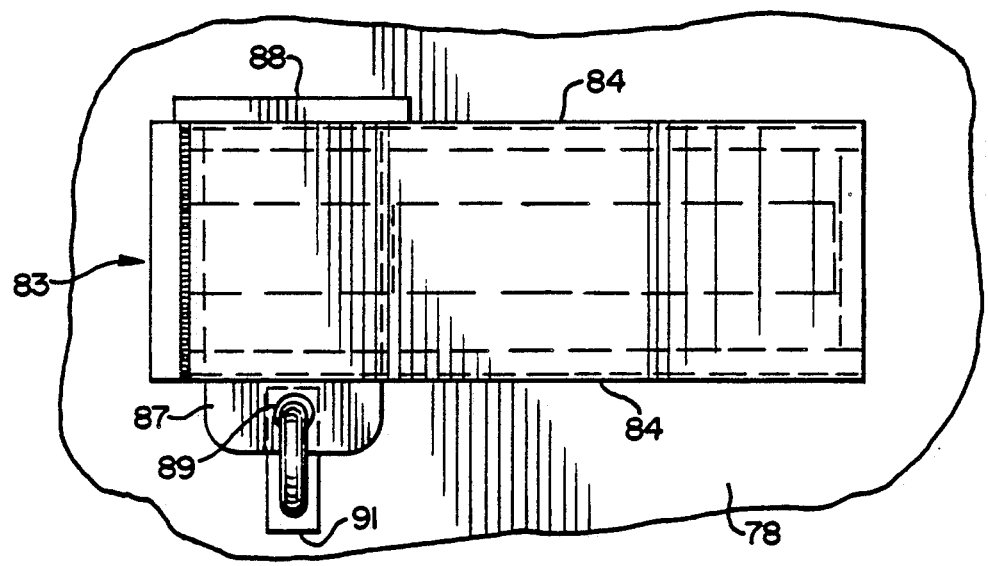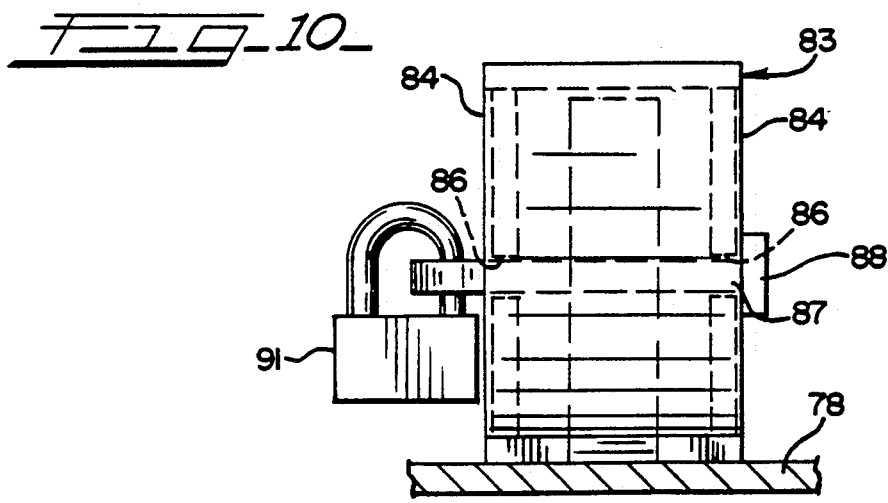

LOCK MECHANISM

FIELD AND BACKGROUND OF THE INVENTION

This invention relates to a locking mechanism for preventing the theft of a roll-off skid.

There is in widespread use today a roll-off skid which may take a variety of forms. At the present time the most common form of skid is a waste collector sometimes referred to as a roll-off waste container. The container is rather large and is carried to a trash collection site on a roll-off hoist truck. The container is rolled off the truck and onto the ground at the site; when it has been filled, the truck returns, couples to the container and pulls the container back onto the bed of the truck, and then removes the container to a landfill, for example, where it is emptied. The container is normally used repeatedly in this manner.

In addition to waste containers, other forms of roll-off skids include, for example, a roll-off job box and a roll-off flat bed. A job box is an enclosed container with an access door in it, which is used by a contractor to transport and store tools at a job site. A roll-off flat bed on the other hand may simply be a flat bed used to carry building supplies, for example, to a job site. For the present purposes, the term roll-off skid is used herein to designate all structures of this type.

Roll-off skids of this nature have large, sturdily built metal bodies and they are relatively expensive, particularly if they contain tools and/or supplies. Since they are expensive, they are also subject to being stolen and this has become a serious problem. It has become the practice for a thief to drive a hoist truck of the type normally used to transport such a skid to a job site during the night, for example, couple to a skid and pull the skid onto the truck, and then drive away. The identification numbers on the skids may then be removed and the skids repainted, and then the skids may be sold by the thief to another party.

Numerous locks have been designed to prevent the theft of trailers. For example, a trailer having a ball coupler may have a lock installed which covers the ball when the trailer is not in use for the purpose of preventing a thief from coupling to the ball. The following listed patents show a variety of locks for the purpose of preventing the theft of trailers and other types of vehicles.

| U.S. Pat. No. | PATENTEE | DATE |
| --- | --- | --- |
| 4,774,823 | Callison | 10/04/88 |
| 4,693,096 | Mercer | 09/15/87 |
| 4,538,827 | Plifka | 09/03/85 |
| 4,480,450 | Brown | 11/06/84 |
| 4,409,804 | Sork | 10/18/83 |
| 4,380,160 | Hoffman | 04/19/83 |
| 4,376,544 | Sette et al. | 03/15/83 |
| 3,782,761 | Cardin, Sr. | 01/01/74 |
| 2,571,349 | Eckles | 10/16/51 |

However, to the knowledge of the inventors there has not previously been available a lock for preventing the theft of a roll-off skid.

It is therefore a general object of the present invention to provide a new and effective lock for such a skid.

SUMMARY OF THE INVENTION

A security lock mechanism in accordance with this invention is for use with a hook-up of a roll-off skid. The hook-up includes at least one plate having an opening formed in it for engagement by a coupler of a truck. The lock mechanism comprises a first part shaped to be positioned closely adjacent the plate, and a second part adapted to extend through the opening of the plate and to be connected to the first part. A lock interconnects the first and second parts for securing them together.

BRIEF DESCRIPTION OF THE DRAWINGS

The invention will be better understood from the following detailed description taken in conjunction with the accompanying figures of the drawings, wherein:

FIG. 1 is a perspective view of a conventional roll-off container including a dead-lift;

FIG. 2 is an enlarged fragmentary perspective view showing the dead-lift and a lock constructed in accordance with the present invention;

FIG. 3 is a fragmentary side view showing different positions of the lock;

FIG. 4 is a view of the lock taken on the line 4—4 of FIG. 3;

FIG. 5 is a view of the lock taken on the line 5—5 of FIG. 3;

FIG. 6 is a fragmentary perspective view showing the lock in position in the dead-lift;

FIG. 7 is a fragmentary perspective view showing a lock constructed in accordance with a second embodiment of the invention, for use with a universal hook-up;

FIG. 8 is a fragmentary sectional view of the lock shown in FIG. 7;

FIG. 9 is a view of the lock taken on the line 9—9 of FIG. 8;

FIG. 10 is a view of the lock taken on the line 10—10 of FIG. 8; and

FIG. 11 is a perspective view showing the lock installed on the universal hook-up.

DETAILED DESCRIPTION OF THE DRAWINGS

While the drawings show and the present description refers specifically to a waste container, it should be understood that this is a specific example only, and that the invention is also applicable to any type of roll-off skid.

FIG. 1 shows a roll-off waste container of a type which is well known to those skilled in this art. The container includes front, back and side walls 10-13 and a bottom wall 14 shown in FIG. 3, which are secured together to form a box-like container having an open upper side. Two braces or supports 16 are secured to the front wall 10 and extend vertically in order to strengthen the wall. At the intersection of the front wall 10 with the bottom wall are provided two rollers 17, and additional rollers (not shown) may be provided at the bottom of the back wall 11. A conventional dead-lift hook-up 18 is provided at the bottom center of the front wall 10 where the front wall meets the bottom wall 14.

With reference to FIGS. 2-6, the dead-lift hook-up 18 includes two vertically elongated side plates 21 and 22 which have an L configuration and are rigidly securely welded to the front wall 10 and to the bottom wall 14. As best shown in FIG. 3, the horizontal bar 25 of each L extends across the bottom edge of the front wall 10 and fits against the bottom wall 14, and the vertical bar 25a extends upwardly along the front wall 10. The two side plates 21 and 22 are spaced apart as best shown in FIGS. 2 and 6, and the inner portions of the side plates 21 and 22 are cut away in the area indicated by the numerals 23 in FIG. 2. At the bottom of the cut away portion 23 of each side plate is formed a bottom recess 24 and a hook shaped portion 25. Similarly, adjacent the upper end of the cut away portion is an upper recess 27 and an upper hook shaped portion 28. In the illustrated version of the dead-lift hook-up, holes are formed through the side plates 21 adjacent the two lower recesses 24, the holes being indicated by the reference numeral 29.

On some universal hook-ups, there is also provided a pivotally mounted hook shaped member 31 which is pivotably mounted on a pin which extends between the upper ends of the two side plates 21 and 22. As best shown in FIG. 6, the member 31 has a hook shaped portion 32 at its outer end which may be used to facilitate holding a coupler (not shown) in place before loading a waste container on a truck.

A lock mechanism 41 in accordance with the present invention is designed to extend into the recesses 24 and 27 behind the hook-shaped portions 25 and 28 and be locked into them in order to prevent access to the recesses 24 and 27 by a coupler, thereby preventing theft of the container. The lock mechanism 41 in accordance with the present invention is illustrated in FIGS. 2-6 and comprises a lower or first part 42 which is designed to extend into and engage the lower recess 24, and an upper or second part 43 which is designed to extend into the upper recess 27. The lower part 42 includes a cylindrical rod 44 which is sized to fit between the cutouts 23 of the two side plates 21 and 22 and be positioned in the two bottom recesses 24 as best shown in FIG. 3. An angled plate 45 extends upwardly from the cylindrical member 44 and has an angled lower portion 46 and a substantially vertical upper portion 47. The second part 43 is hingedly connected to the plate 45 by a hinge pin 48 and a hinge knuckle 49. The part 43 includes a substantially flat plate portion 51 which extends substantially upwardly from the knuckle 49 when the parts are connected together as shown in FIG. 3, and it further includes a rod 52 which is rigidly secured to the upper end of the plate 51 and extends substantially laterally between the two side plates 21 and 22. The rod 52 is also sized to be inserted into the cutouts 23, and the rod 52 extends into the upper recesses 27 of the side plates 21 and 22 when the lock mechanism is installed, as shown in FIGS. 3 and 6.

A leaf 53 is secured to the upper end portion of the plate 51 and extends outwardly in the direction of the flat upper portion 47 of the part 41. A slot 54 is formed in the part 41, and when the two parts are assembled as shown in FIG. 3, the leaf 53 extends through the slot 54. A hole 56 is formed adjacent the outer end of the leaf 53 and appears on the outer side of the plate 45 as shown in solid lines in FIG. 3 when the parts are installed, and a conventional lock 57 (FIG. 6) is engaged in the hole 56 when the lock mechanism is installed.

To install the lock mechanism in accordance with this invention in a dead-lift hook-up, the two parts 42 and 43 are pivoted on the hinge pin 48 to the position shown in FIG. 2 and in the dash-dot lines in FIG. 3. In this position of the parts, the two pins 44 and 52 are relatively close together. The lower pin 44 is then positioned in the lower recess 24 as shown in FIG. 3, and then the upper end of the part 42 is pushed back into the space between the two plates 21 and 22. This action causes the upper pin 52 to slide upwardly along vertical portions 61 of the cutouts of the two side plates 21 and 22. As the pin 52 slides upwardly to the recess 27, the leaf 51 folds toward the upper portion of the part 42 and the leaf 53 projects through the slot 54. In the fully assembled position shown in full lines in FIGS. 3 and 6, the pin 52 extends snugly within the upper recesses 27 of the two side plates 21 and 22, and the hole 56 in the leaf 53 is accessible from the outer side of the part 42. The lock 57 may then be installed as shown in FIG. 6 which prevents the two parts 42 and 43 from unfolding.

It will be apparent from the solid line locked position shown in FIG. 3 that the lock mechanism 41 cannot be removed from the two side plates 21 and 22 of the hook-up because the two pins 44 and 52 are retained within the recesses 24 and 27 by the hook shaped portions 25 and 28. As a consequence, the lock mechanism covers or encloses the openings of the side plates 21 and 22 and prevents a thief from attaching a coupler to the hook-up. The lock mechanism may, of course, be readily removed from the hook-up by unlocking and removing the lock 57, thereby enabling the two parts 42 and 43 to be pivoted to the unlocked position shown in the dash-dot lines in FIG. 3 and the solid lines position shown in FIG. 2.

FIGS. 7—11 show an alternative lock mechanism for a universal type of hook-up. With specific reference to FIG. 7, a container 71 having a universal hook-up includes a front wall 72, a bottom wall 73 and a recess wall 74 which projects toward the interior of the container from the front wall 72 and exposes a portion of the bottom wall 73 at the front-center of the bottom wall 73. A conventional universal hook-up 76 includes a hook shaped member 77 which is rigidly secured as by welding to a support plate 78 on the bottom wall. The universal hook-up 77 includes a vertical portion 79 which extends upwardly from the plate 78, and a hook portion 81 which extends rearwardly from the upper end of the vertical portion 79, thereby forming a hook opening 82 which faces toward the rear of the container.

A lock mechanism 83, according to this invention, forms an enclosure around the hook-up member 77, and comprises two side plates 84 which extend vertically closely adjacent the two lateral sides of the member 77, and edge plates 85, 85a and 85b which extend between and are rigidly secured to the two plates 84. As best shown in FIG. 8, the plates 85, 85a and 85b are sized so that they fit closely adjacent the associated sides of the member 79. Aligned slots 86 are formed through the two side plates 84, and a leaf or tongue 87 is located, when the lock mechanism is engaged, through the two slots 86. As shown in FIGS. 8 and 10, the leaf 87 is located closely adjacent the edges of the hook portion 81, and it is relatively snugly received within the openings 86. The leaf 87 has a head 88 formed at one end and a hole 89 through the other end, the hole 89 being exposed when the leaf 87 is positioned through the two slots 86. A lock 91 is fastened in the hole 89 and prevents the leaf 87 from being removed from the slots. When installed as shown and described, the enclosure formed by the walls 84 and 85 cannot be removed from the member 77 because the leaf 87 engages the part 81 and prevents removal of the enclosure. As a consequence, the lock mechanism 83 encloses the hook-shaped member 79 and prevents a coupler from being attached to the member 77.

It will be apparent from the foregoing that a novel and useful lock mechanism has been provided. The lock mechanism is easily attachable to a hook-up of a roll-off skid and it prevents the hook-up of the skid from being connected to by a coupler of an unauthorized party. Further, the lock mechanism is ruggedly constructed and it is at least partially enclosed within the skid or the hook-up, thereby making it more difficult for a potential thief to dismantle the lock mechanism.

What is claimed is:

1. A security lock for a roll-off skid, the skid including a generally horizontal bottom wall, and a hook-up secured to said wall, said hook-up including at least one plate extending outwardly from said wall and an opening formed in said plate, said opening being engageable by a coupler of a hoist truck, said lock comprising a first part adapted to be positioned closely adjacent said plate, a second part adapted to extend into said opening of said plate and cover said opening, and a third part engageable with said first and second parts for securing said first and second parts together and said second part in said opening.

2. A security lock as set forth in claim 1, wherein the hook-up is a dead-lift type and includes two adjacent plates and an opening in each plate, and said second part of said lock extends into the openings of both plates.

3. A security lock as set forth in claim 2, wherein each of said plates of said hook-up further includes a second opening, and said first part of said lock includes a portion operable to extend into said second openings.

4. A security lock as set forth in claim 2, and further including means for hingedly connecting said first and second parts together.

5. A security lock as set forth in claim 1, wherein the hook-up is a universal type and said opening in said plate forms a hook shape, said first part enclosing said plate and said second part extending through said opening.

6. A security lock as set forth in claim 5, wherein said first part has a hole formed therethrough, and said second part also extends through said hole.

7. A lock mechanism for a dead-lift of a roll-off skid, the dead-lift including two spaced plates secured to and projecting from the skid, each of said plates having upper and lower recesses formed therein behind hook-shaped portions of the plates, said lock mechanism comprising a first part adapted to be positioned in the space between the plates and in the lower recesses, a second part adapted to be positioned in the space between the plates and in the upper recesses and means for connecting said first and second parts together with said first and second parts in said upper and lower recesses.

8. A lock mechanism as set forth in claim 7, wherein said first and second parts are hinged together.

9. A lock mechanism as set forth in claim 8, and further including a leaf attached to one of said first and second parts and a slot for said leaf formed in the other of said first and second parts.

10. A lock mechanism for a universal hook-up of a roll-off said, the hook-up including a hook-shaped member secured to the skid and forming a hook opening, said lock mechanism comprising enclosure means adapted to be positioned over and to enclose said hook-shaped member, and latch means connected to said enclosure means and adapted to extend through said hook opening.

11. A lock mechanism as set forth in claim 10, wherein said enclosure means comprises side walls having aligned openings formed therein, and said latch means extends through said openings.

12. A lock mechanism as set forth in claim 11, wherein said latch means comprises an enlarged head at one end thereof and a lock opening adjacent the other end thereof.

* * * * *